United States Patent
Asakura et al.

(10) Patent No.: US 11,094,342 B2
(45) Date of Patent: Aug. 17, 2021

(54) DISK DEVICE

(71) Applicants: Kabushiki Kaisha Toshiba, Tokyo (JP); Toshiba Electronic Devices & Storage Corporation, Tokyo (JP)

(72) Inventors: Makoto Asakura, Bunkyo Tokyo (JP); Naoki Tagami, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/919,327

(22) Filed: Jul. 2, 2020

(65) Prior Publication Data
US 2021/0027805 A1    Jan. 28, 2021

(30) Foreign Application Priority Data
Jul. 23, 2019   (JP) .............................. JP2019-135513

(51) Int. Cl.
*G11B 5/596*  (2006.01)
*G11B 5/02*   (2006.01)

(52) U.S. Cl.
CPC ............ *G11B 5/59688* (2013.01); *G11B 5/02* (2013.01)

(58) Field of Classification Search
CPC ... G11B 5/127; G11B 5/82; G11B 2220/2516; G11B 20/12; G11B 15/087; G11B 5/59633; G11B 5/58; G11B 5/59688; G11B 5/5543; G11B 5/09; G11B 5/00

USPC .......... 360/78.12, 48, 72.2, 75, 71.01, 78.14, 360/77.08
See application file for complete search history.

(56) References Cited

U.S. PATENT DOCUMENTS

| | | | |
|---|---|---|---|
| 4,208,679 A | 6/1980 | Hertrich | |
| 4,390,912 A | 6/1983 | Hertrich et al. | |
| 6,967,808 B1 | 11/2005 | Bandic et al. | |
| 7,746,595 B1* | 6/2010 | Guo ................... | G11B 5/59688 360/77.08 |
| 8,908,303 B1* | 12/2014 | Yamada ............ | G11B 5/59688 360/29 |
| 10,360,930 B1* | 7/2019 | Asakura ................. | G11B 5/127 |
| 2009/0067090 A1* | 3/2009 | Ling ...................... | B82Y 10/00 360/135 |
| 2009/0153998 A1* | 6/2009 | Nakamura ............ | G11B 5/743 360/39 |

* cited by examiner

*Primary Examiner* — Nabil Z Hindi
(74) *Attorney, Agent, or Firm* — White & Case LLP

(57) ABSTRACT

According to one embodiment, in a disk device, a first pattern cut out from a burst region at a certain servo track by a first length and with a first start position, does not match a second pattern cut out from the burst region at an adjacent servo track by the first length and with an arbitrary second start position including first timing. The burst region at the servo tracks includes a first burst pattern including a first magnetized portion where a first value is recorded and a second magnetized portion where a second value reverse to the first value in polarity is recorded, the second magnetized portion being adjacent to the first magnetized portion in a down track direction. A width of the first magnetized portion in the down track direction and a width of the second magnetized portion in the down track direction are different from each other.

19 Claims, 9 Drawing Sheets

FIG.5A

| offtrack | BG DEVIATION (dibit) | Null N | Null Q |
|---|---|---|---|
| +0.25 | 0 | 1100110011001100 | 1100110011001100 |
| +0.25 | 0.5 | 0011001100110011 | 0011001100110011 |
| -0.75 | 0 | 0011001100110011 | 0011001100110011 |
| +1.25 | 0 | 0011001100110011 | 0011001100110011 |

FIG.5B

| offtrack | BG DEVIATION (dibit) | Null N | Null Q |
|---|---|---|---|
| +0.25 | 0 | 1110111011101110 | 1110111011101110 |
| +0.25 | 0.5 | 1011101110111011 | 1011101110111011 |
| -0.75 | 0 | 0001000100010001 | 0001000100010001 |
| +1.25 | 0 | 0001000100010001 | 0001000100010001 |

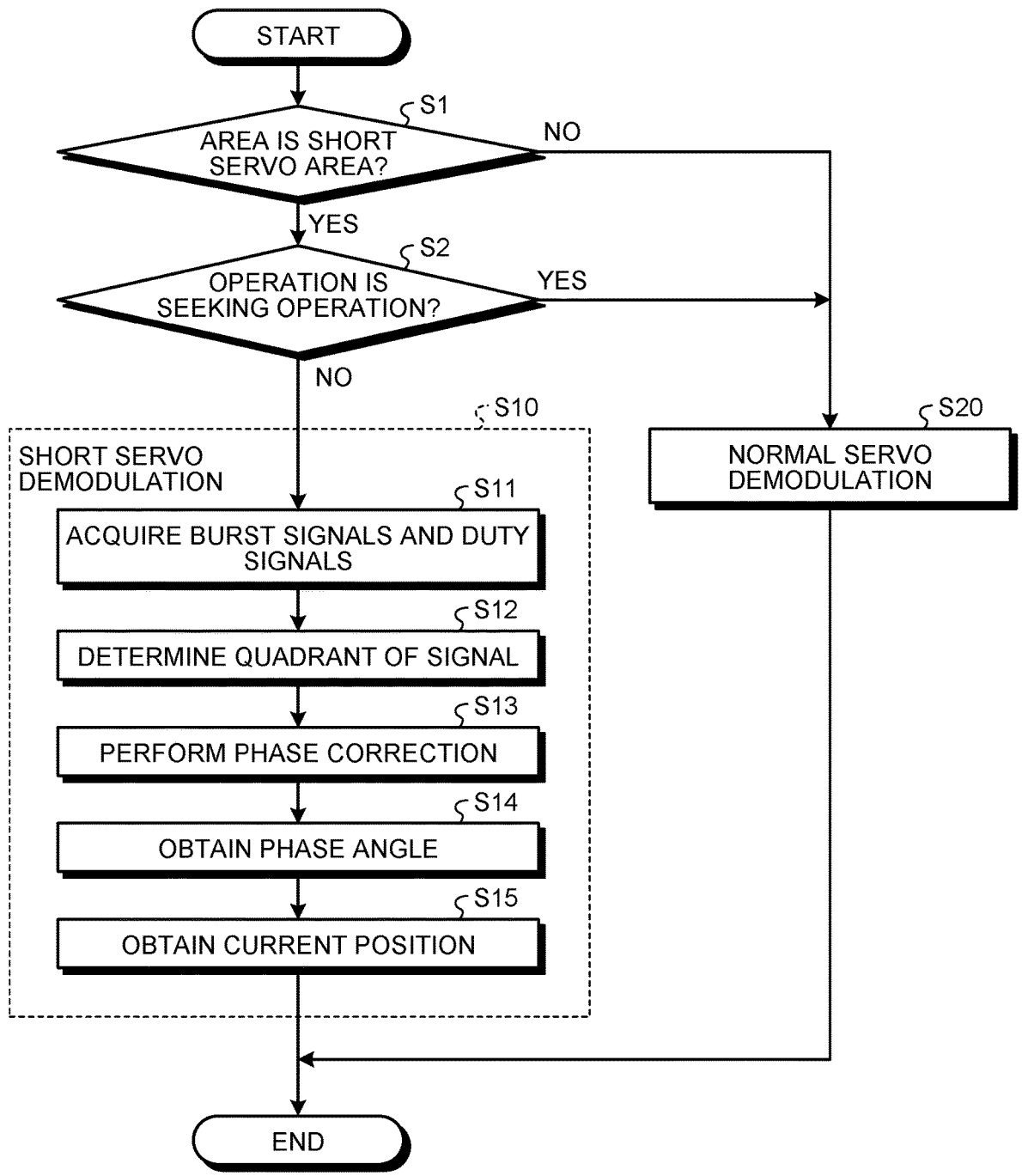

DISK DEVICE

CROSS-REFERENCE TO RELATED APPLICATIONS

This application is based upon and claims the benefit of priority from Japanese Patent Application No. 2019-135513, filed on Jul. 23, 2019; the entire contents of which are incorporated herein by reference.

FIELD

Embodiments described herein relate generally to a disk device.

BACKGROUND

In a disk device including a disk medium that has a plurality of tracks provided with servo areas and data areas, information on the servo areas is used to perform positioning of the head, and writing and/or reading of data is performed with respect to the data areas. In this case, it is desired to improve the data recording capacity of the disk medium.

BRIEF DESCRIPTION OF THE DRAWINGS

FIGS. 5A and 5B are diagrams each illustrating magnetization patterns in the servo burst region in the embodiment;

FIG. 9 is a flowchart illustrating an operation of the disk device according to the embodiment.

DETAILED DESCRIPTION

In general, according to one embodiment, there is provided a disk device including a head and a disk medium. The disk medium includes a servo area having a plurality of servo tracks. The servo area includes a burst region of a null type in which a magnetization polarity is reversed for every one of the servo tracks. A first pattern, which is cut out from the burst region at a certain servo track by a first length and with a first start position, does not match a second pattern, which is cut out from the burst region at an adjacent servo track by the first length and with an arbitrary second start position including first timing. The burst region at the servo tracks includes a first burst pattern. The first burst pattern includes a first magnetized portion and a second magnetized portion. The first magnetized portion is a portion where a first value is recorded. The second magnetized portion is a portion where a second value reverse to the first value in polarity is recorded. The second magnetized portion is adjacent to the first magnetized portion in a down track direction. A width of the first magnetized portion in the down track direction and a width of the second magnetized portion in the down track direction are different from each other.

Exemplary embodiments of a disk device will be explained below in detail with reference to the accompanying drawings. The present invention is not limited to the following embodiments.

EMBODIMENT

Figure 1:
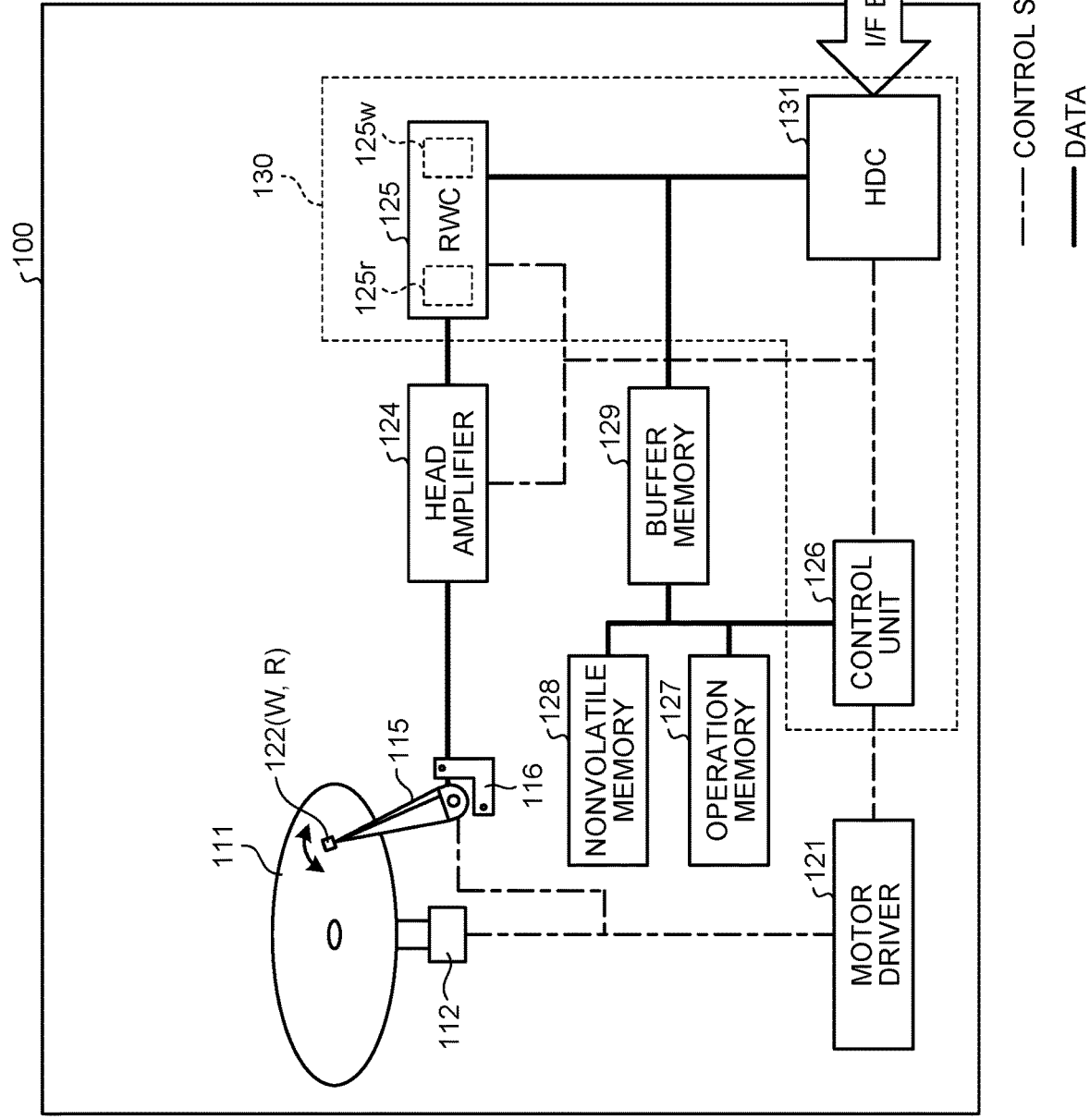
FIG. 1 is a diagram illustrating a configuration of a disk device according to an embodiment.

An explanation will be given of a disk device 100 according to an embodiment, with reference to FIG. 1. FIG. 1 is a diagram illustrating a configuration of the disk device 100.

For example, the disk device 100 is a device (such as a disk device or hard disk device) configured to record information into a disk medium 111 by a head 122 and to read a signal from the disk medium 111 by the head 122. Specifically, the disk device 100 includes the disk medium 111, a spindle motor (SPM) 112, a motor driver 121, the head 122, an actuator arm 115, a voice coil motor (VCM) 116, a head amplifier 124, a read/write channel (RWC) 125, a hard disk controller (HDC) 131, a buffer memory 129, and a control unit 126.

For example, the disk medium 111 is a magnetic recording medium having an outer diameter of $\phi$95 mm, and is configured to rotate at a predetermined rotational speed about a rotational axis by the SPM 112. The SPM 112 is driven to rotate by the motor driver 121. The disk device 100 may include a plurality of disk mediums, but will be explained by mainly focusing on one disk medium 111 for the sake of simplicity of description and illustration.

The head 122 is disposed at the tip of the actuator arm 115, and is moved by the VCM 116 driven by the motor driver 121, to seek a target track along the radial direction of the disk medium 111 (the track width direction), and to perform a tracking operation on the target track. The head 122 includes a read element R and a write element W. In the head 122, the write element W is arranged with a predetermined gap amount with respect to the read element R. The read element R is arranged on the upstream side from the write element W in the rotational direction of the disk medium 111. In the head 122, an operation of reading a signal from the disk medium 111 by the read element R and an operation of writing a signal into the disk medium 111 by the write element W are selectively performed by switching.

When the disk medium 111 is in a state where the rotation is stopped or the like, the head 122 is retreated on a ramp (not illustrated). The disk device 100 may include a plurality of heads 122 to correspond to respective recording faces (the front faces and rear faces) of a plurality of disk mediums 111. However, hereinafter, an explanation will be given by mainly focusing on one disk medium 111 and one head 122 corresponding thereto, for the sake of simplicity of description and illustration.

The head amplifier 124 amplifies a signal read from the disk medium 111 by the head 122, and outputs and supplies the signal to the RWC 125. Further, the head amplifier 124 amplifies a signal for writing data into the disk medium 111, which has been supplied from the RWC 125, and supplies the signal to the head 122.

The HDC 131 performs control for transmitting and receiving data to and from a host computer 140 via an I/F bus, control of the buffer memory 129, and data error correction processing with respect to write data. The buffer memory 129 is used as a cache for data to be transmitted and received to and from the host computer 140. Further, the buffer memory 129 is used for temporarily storing data read from the disk medium 111, data to be written into the disk medium 111, or control firmware read from the disk medium 111.

The RWC 125 includes a read processing circuit 125$r$ and a write processing circuit 125$w$. The write processing circuit 125$w$ performs code modulation on data to be written to the disk medium 111, which has been supplied from the HDC 131, and supplies the data to the head amplifier 124. Further, the read processing circuit 125$r$ performs code demodulation on a signal read from the disk medium 111 and supplied from the head amplifier 124, and outputs the signal as digital data to the HDC 131.

The control unit 126 is connected to an operation memory 127 (such as an SRAM), a nonvolatile memory 128 (such as a flash memory), and a buffer memory 129 for temporary storage (such as a DRAM). For example, the control unit 126 is a CPU or MPU, and is configured to perform overall control of the disk device 100, in accordance with firmware stored in the nonvolatile memory 128 or disk medium 111 in advance. The firmware includes initial firmware, and control firmware to be used in the normal operation. The initial firmware, which is executed first at the time of startup, is stored in the nonvolatile memory 128, for example. The control firmware, which is used in the normal operation, is recorded in the disk medium 111. The control firmware is once read from the disk medium 111 to the buffer memory 129 by control according to the initial firmware, and is then stored into the operation memory 127.

Here, the configuration including the RWC 125, the control unit 126, and the HDC 131 may be regarded as a controller 130. The controller 130 may be mounted as a system-on-chip (SoC), for example.

Figure 2:
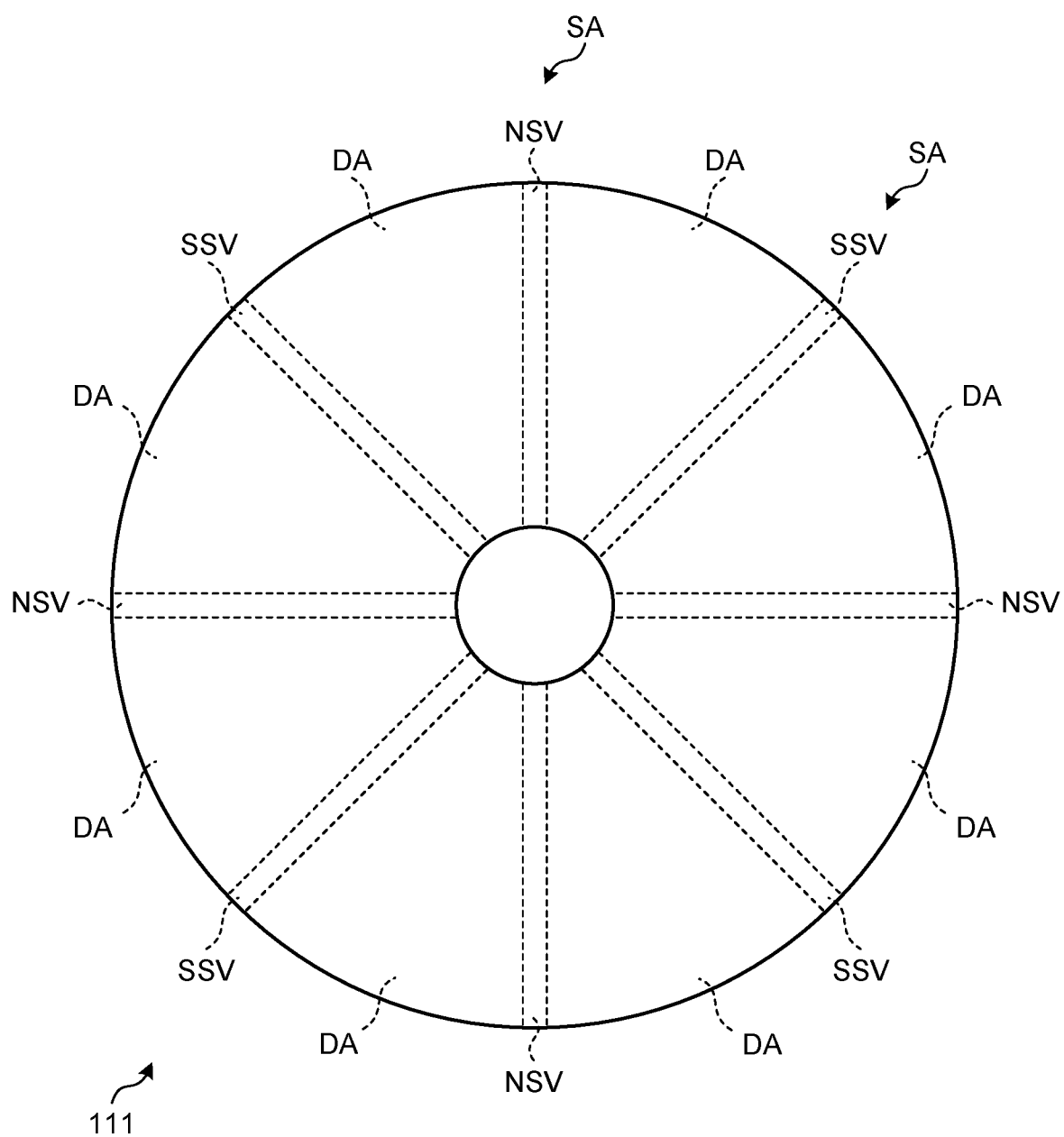
FIG. 2 is a diagram illustrating a configuration of a disk medium in the embodiment.

In the disk device 100, a plurality of tracks (a plurality of servo tracks) are defined concentrically on the disk medium 111 by servo patterns recorded on the disk medium 111. For example, as illustrated in FIG. 2, data areas DA and servo areas SA are arranged on the disk medium 111. FIG. 2 is a diagram illustrating a configuration of the disk medium 111. The data areas DA are areas where data is recorded. The servo areas SA are areas where the servo patterns are recorded. The disk medium 111 includes a plurality of servo areas SA. Each servo area SA may also be referred to as "servo sector" in some cases. The plurality of servo areas SA are radially extended in the radial direction of the disk medium 111, and are discretely arranged at predetermined intervals therebetween in the circumferential direction. Each data area DA is arranged between two servo areas SA consecutive in the circumferential direction.

In the radial direction of the disk medium 111, it is assumed that the side facing the outer circumference is "outside", and the side facing the inner circumference is "inside". The controller 130 can manage track numbers, which are allocated to a plurality of tracks sequentially from the inside to the outside or sequentially from the outside to the inside, as information indicating the radial position on the disk medium 111.

The controller 130 can perform positioning of the head 122 on a track on which the head 122 travels, by using information on the servo patterns read from the servo areas SA, to perform writing and/or reading of data with respect to the data areas DA.

The disk device 100 employs a servo demodulation scheme using a short servo mode, to increase the data recording capacity of the disk medium 111. The servo areas SA include normal servo areas NSV and short servo areas SSV. FIG. 2 illustrates, as an example, a configuration in which the normal servo areas NSV and the short servo areas SSV are alternately arranged one by one in the circumferential direction. However, two or more short servo areas SSV may be arranged between two normal servo areas NSV consecutive in the circumferential direction.

The normal servo areas NSV may be different from the short servo areas SSV in terms of the servo information demodulation scheme. The servo information read from the normal servo areas NSV are demodulated by a normal servo demodulation scheme. The servo information read from the short servo areas SSV are demodulated by a short servo demodulation scheme.

For example, the normal servo demodulation scheme performs the processing illustrated in FIGS. 3A to 3D, and the short servo demodulation scheme performs the processing illustrated in FIGS. 3E to 3H. FIGS. 3A to 3H are diagrams illustrating the normal servo demodulation scheme and the short servo demodulation scheme in the embodiment.

Figure 3:
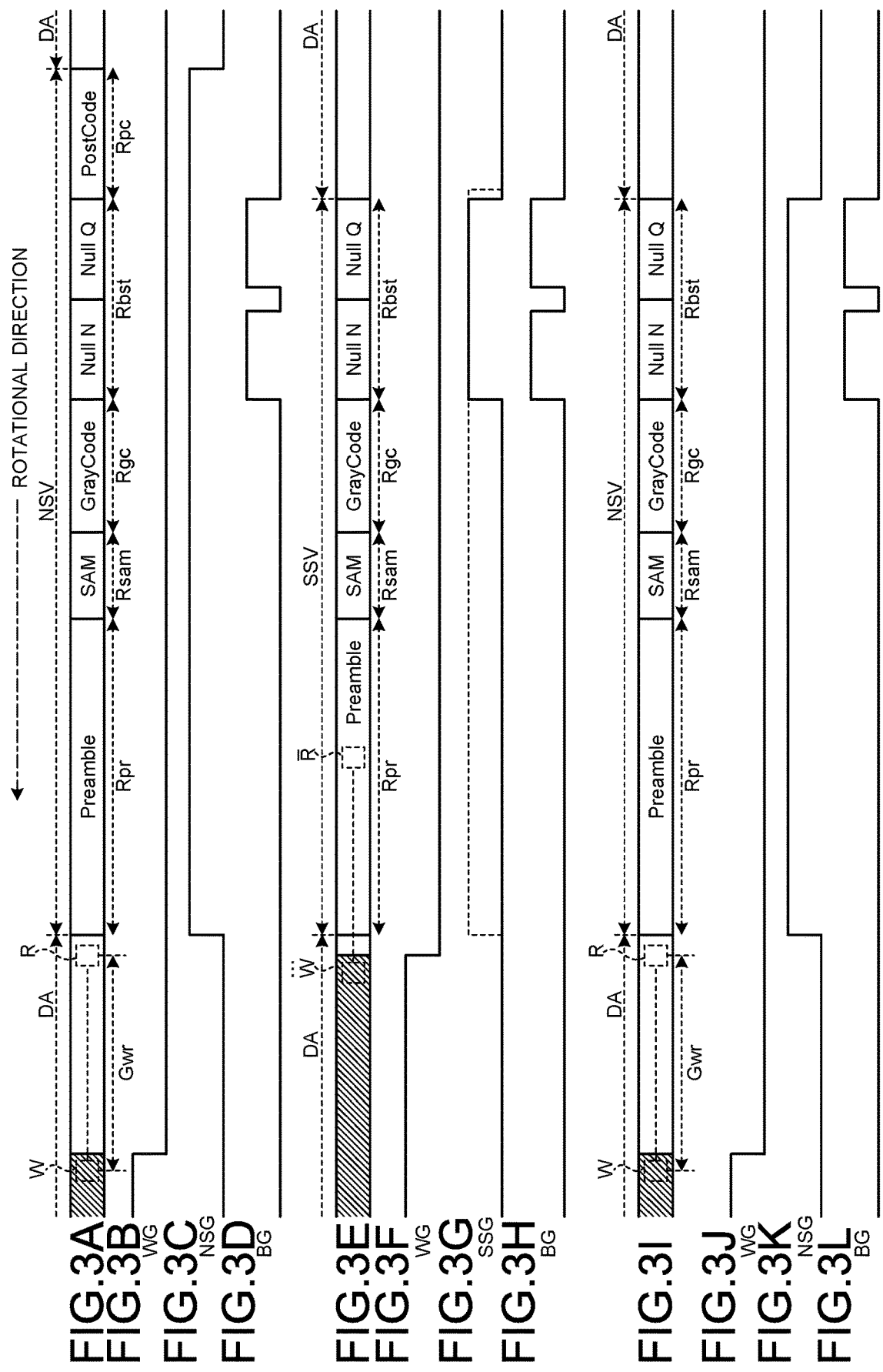
FIGS. 3A to 3L are diagrams illustrating a normal servo demodulation scheme and a short servo demodulation scheme in the embodiment.

The normal servo demodulation scheme corresponds to each normal servo area NSV illustrated in FIG. 3A. The normal servo area NSV includes a plurality of types of patterns as servo patterns, such as a preamble, a servo mark, a gray code, a burst pattern, and a post code. In accordance with these servo patterns, the normal servo area NSV includes a preamble region Rpr, a servo mark region Rsam, a gray code region Rgc, a servo burst region Rbst, and a post code region Rpc. The preamble region Rpr is a region where the preamble is recorded. The preamble is a pattern serving as a reference for synchronizing the amplitude and the phase with respect to the servo patterns. The servo mark region Rsam is a region where the servo mark is recorded. The servo mark is a pattern indicating the reference position in the circumferential direction in the track. The gray code region Rgc is a region where the gray code is recorded. The gray code includes information (a track number or the like) indicating the radial position of the track in the disk medium 111. The servo burst region Rbst is a region where the burst pattern is recorded. The burst pattern is pattern for detecting the off-track amount of the head 122 from the track center. The post code region Rpc is a region where the post code is recorded. The post code includes information on a correction amount (such as an eccentricity correction amount) for correcting an error of the off-track amount obtained by the burst pattern.

The servo burst region Rbst may be a burst region of the null type in which the polarity of the recorded value changes in accordance with the off-track position of the head 122 from the track center. In other words, a burst pattern of the null type can be employed as the burst pattern recorded in the servo burst region Rbst. In the null-type burst pattern, the signal amplitude value calculated by channel reference frequency DFT processing changes to positive or negative depending on the off-track position. The null-type burst pattern includes two phases of an N-phase (Null N) and a Q-phase (Null Q), and can reduce the bit length of the servo burst region Rbst to approximately half, as compared to the case including four phases of an A-phase, a B-phase, a C-phase, and a D-phase.

As illustrated by a dotted line in FIG. 3A, in the head 122, the write element W is arranged with a predetermined gap amount Gwr with respect to the read element R substantially in the circumferential direction. The read element R is arranged on the upstream side of the write element W in the rotational direction of the disk medium 111, which is illustrated by an arrow of a one-dot chain line in FIG. 3A. In the head 122, an operation of reading a signal from the disk medium 111 by the read element R and an operation of writing a signal into the disk medium 111 by the write element W are selectively performed by switching.

In the normal servo demodulation scheme, the servo patterns are read from the leading end (preamble) of the normal servo area NSV. Thus, as illustrated in FIG. 3B, a write gate signal WG transitions from an asserted state to a deasserted state at a position before the leading end of the normal servo area NSV by the gap amount Gwr, and data is thereby written to a location indicated by diagonal hatching in FIG. 3A. A servo gate signal NSG illustrated in FIG. 3C transitions from a deasserted state to an asserted state at a position corresponding to the leading end of the normal servo area NSV. A burst gate signal BG illustrated in FIG. 3D transitions from a deasserted state to an asserted state at a position corresponding to the leading end of the Null N, and transitions from the asserted state to the deasserted state at a position corresponding to the tail end of the Null N. The burst gate signal BG transitions from the deasserted state to the asserted state at a position corresponding to the leading end of the Null Q, and transitions from the asserted state to the deasserted state at a position corresponding to the tail end of the Null Q. Further, the servo gate signal NSG illustrated in FIG. 3C transitions from the asserted state to the deasserted state at a position corresponding to the tail end of the normal servo area NSV.

Consequently, in the normal servo demodulation scheme, demodulation processing is performed by using respective ones of the preamble, the servo mark, the gray code, and the burst pattern.

Here, the normal servo area NSV may not include the post code, as illustrated in FIG. 3I. In this case, a write gate signal WG illustrated in FIG. 3J is the same as that in FIG. 3B, but a servo gate signal NSG illustrated in FIG. 3K transitions from an asserted state to a deasserted state at a position corresponding to the tail end of the Null Q. A burst gate signal BG illustrated in FIG. 3L is the same as that in FIG. 3D.

On the other hand, the short servo demodulation scheme corresponds to each short servo area SSV illustrated in FIG. 3E. The short servo area SSV includes a plurality of types of patterns as servo patterns, and, for example, may include patterns substantially the same as those of the normal servo area NSV.

In the short servo demodulation scheme, data is recorded up to a position immediately before the leading end of the short servo area SSV. Thus, as illustrated in FIG. 3F, a write gate signal WG transitions from an asserted state to a deasserted state at a position before the leading end of the short servo area SSV, and data is thereby written to a location indicated by diagonal hatching in FIG. 3E. As illustrated by a dotted line in FIG. 3E, when the write element W is present at a position before the leading end of the short servo area SSV, the read element R is present in the short servo area SSV (for example, in the preamble region Rpr), and thus cannot read the servo patterns from the leading end.

Accordingly, a servo gate signal SSG illustrated in FIG. 3G transitions from a deasserted state to an asserted state at a position corresponding to the leading end of the servo burst region Rbst. A burst gate signal BG illustrated in FIG. 3H transitions from a deasserted state to an asserted state at a position corresponding to the leading end of the Null N, and transitions from the asserted state to the deasserted state at a position corresponding to the tail end of the Null N. The burst gate signal BG transitions from the deasserted state to the asserted state at a position corresponding to the leading end of the Null Q, and transitions from the asserted state to the deasserted state at a position corresponding to the tail end of the Null Q. Further, the servo gate signal SSG illustrated in FIG. 3G transitions from the asserted state to the deasserted state at a position corresponding to the tail end of the servo burst region Rbst. Here, as illustrated by a dotted line in FIG. 3G, in a seeking operation, the short servo area SSV may be subjected to demodulation processing, as in the normal servo demodulation scheme.

Accordingly, in the short servo demodulation scheme, demodulation of the burst pattern is performed without demodulation of the preamble, the servo mark, and the gray code. Then, the head position is obtained on the basis of information on an offset amount derived from the demodulation result of the burst pattern, and the head is positioned to perform recording/reproduction of data.

In this case, it is not possible to obtain synchronization information based on the preamble, information on the reference position in the circumferential direction based on the servo mark, and information (a track number or the like) indicating the radial position of the track based on the gray code. Accordingly, when there is matching between a pattern shifted in a down track direction and a pattern shifted in a cross track direction, with respect to a predetermined burst pattern, it may be difficult in the short servo demodulation scheme to distinguish a deviation in the down track direction (i.e., a deviation in read timing) from a deviation in the cross track direction (i.e., a deviation in address in the radial direction). In some cases, the estimation error may occur, and the current head position may be mistaken.

In order to obtain the current position of the head 122 from the burst pattern, it is necessary to have a timing deviation amount of the burst gate BG and the address value of the gray code at the time of acquiring the burst value of the current sector.

As regard the latter issue, even if there is a demodulation error of the gray code address value in demodulation processing of the normal servo area NSV immediately before, it is conceivable to perform correction by±one track on the basis of quadrant determination of the acquired burst value, and thereby to obtain a correct gray code address value.

As regard the former issue concerning a timing deviation amount of the burst gate BG, it is conceivable to use a system of estimating a phase deviation to eliminate a position deviation estimation error (real-time initial phase correction). In the real-time initial phase correction, an arctan value is calculated from a sine coefficient and a cosine coefficient of the acquired burst value, and the phase angle of a timing deviation of the burst gate BG is obtained to perform correction.

For example, as shown in a formula 1, an arctan is calculated from a sine component ($N_s$, $Q_s$) and a cosine component ($N_c$, $Q_c$) at the time of channel reproduction of each burst, and a phase angle θ[rad] is obtained. Then, on the assumption that this θ component represents the phase difference corresponding to the timing deviation with respect to the burst cycle, a position deviation is estimated by performing correction processing on the phase deviation corresponding to the θ.

$$\theta = 2\pi * \Delta T / T_{dibit} = \arctan(N_s/N_c) = \arctan(Q_s/Q_c) \qquad \text{Formula 1}$$

In the formula 1, $\Delta T$ denotes a timing deviation amount of the burst gate BG, and $T_{dibit}$ denotes a pattern cycle in the down track direction. $N_s$ denotes the sine component of a burst value read from the Null N, and $N_c$ denotes the cosine component of the burst value read from the Null N. $Q_s$ denotes the sine component of a burst value read from the Null Q, and $Q_c$ denotes the cosine component of the burst value read from the Null Q.

In the formula 1, on the premise that it is the correct timing for the timing of the burst gate BG to acquire a burst value in a "0101" pattern or "1010" pattern, a burst acquired value is subjected to rotation correction to attain conversion into either one of the burst outputs described above.

The timing of the burst gate BG at the short servo demodulation is timing with reference to synchronization information detected from the pattern of the servo mark region at the normal servo demodulation immediately before. Depending on the timing deviation of the burst gate BG, there is a possibility that correction ends up with being made as the "1010" pattern although the correction should be made as the "0101" pattern. Accordingly, the off-track amount may not be correctly detected.

For example, if reproduction that should be performed as the "0101" pattern ends up with the "1010" pattern, which is the reverse pattern, correction processing on the gray code address value becomes erroneous. Consequently, there is a possibility that the current position is erroneously reproduced such that the reproduced radial position is erroneous by "½×pattern cycle" in the radial direction, i.e., by one servo track.

As a countermeasure, it is conceivable to provide a pattern for detecting the timing deviation of the burst gate BG and thereby not to mistake the timing deviation amount of the burst gate BG. By using this pattern for detecting the timing deviation of the burst gate BG, it is possible to accurately grasp the timing deviation amount of the burst gate BG and to determine whether the correction should be made as the "0101" pattern or "1010" pattern. However, as a pattern region for detecting the timing deviation is added, the disk medium 111 may be in a state where the servo occupancy rate is increased and the data recording capacity is reduced.

In consideration of the above, the disk medium 111 is configured such that the pattern of the servo burst region Rbst is formed of a pattern that can distinguish a deviation in the down track direction and a deviation in the cross track direction from each other. Consequently, it is made possible to appropriately derive the head position at the short servo demodulation while suppressing a reduction of the data recording capacity.

Specifically, the pattern of the servo burst region Rbst is configured such that, with respect to this pattern, a pattern existing at a position shifted by half the pattern cycle in the down track direction is different from a pattern existing at a position shifted by the track cycle in the cross track direction. For example, the burst pattern of each of the N-phase and the Q-phase included in the servo burst region Rbst is formed of a pattern subjected to self servo write (SSW) such that the duty ratios of N- and S-magnetic properties are shifted from 50% to a large extent. Consequently, when a signal read from the servo burst region contains a deviation component, it can be clearly distinguished whether this deviation is a deviation in the down track direction (i.e., a deviation in read timing) or a deviation in the cross track direction (i.e., a deviation in address in the radial direction). Thus, by devising the servo burst pattern, without providing an additional pattern for specifying the timing deviation of the burst gate BG, the estimated position at the real-time initial phase correction can be corrected without erroneous determination. As a result, the head position at the short servo demodulation can be appropriately derived. Further, as the pattern for detecting the timing deviation of the burst gate BG is not required, the servo occupancy rate in the case of employing the short servo can be suppressed, and a larger capacity drive can be provided.

Figure 4:
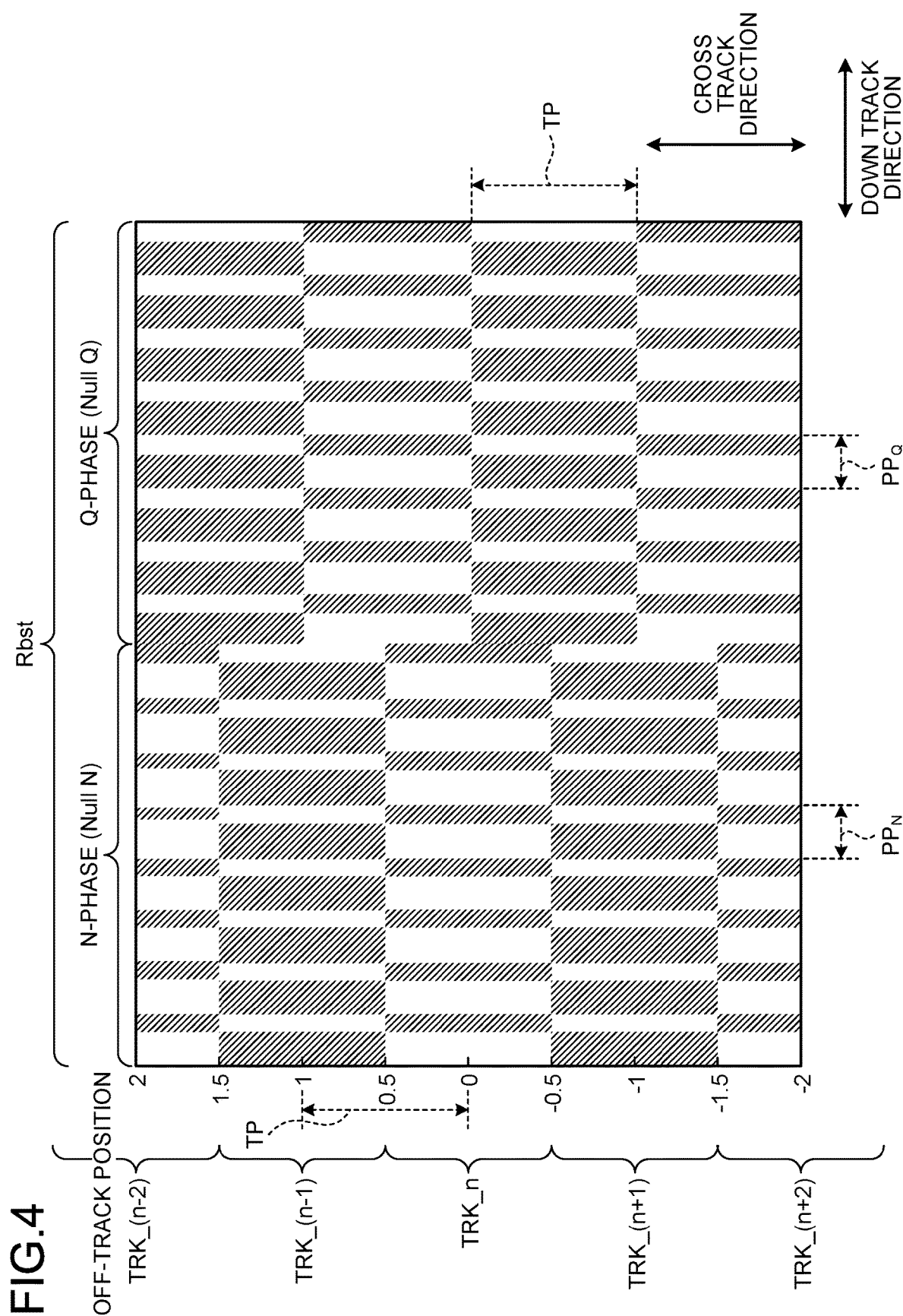
FIG. 4 is a diagram illustrating a configuration of a servo burst region in the embodiment.

More specifically, the servo burst region Rbst may be configured as illustrated in FIG. 4. FIG. 4 is a diagram illustrating a configuration of the servo burst region Rbst. In FIG. 4, the portions magnetized in a first magnetization direction (i.e., portions where a first value is recorded) are shown with diagonal hatching, and the portions magnetized in a second magnetization direction (i.e., portions where a second value is recorded) are shown without hatching. The polarity of the second magnetization direction is reverse to the polarity of the first magnetization direction. Each portion magnetized in one of the first magnetization direction and the second magnetization direction may be referred to as "N-magnetized portion", and each portion magnetized in the other direction may be referred to as "S-magnetized portion".

As illustrated in FIG. 4, the servo burst region Rbst includes an N-phase (Null N) and a Q-phase (Null Q).

As regards the cross track direction (radial direction), in the N-phase, in order to realize a pattern corresponding to the A-phase to the B-phase, a magnetization pattern may be arranged with phases in which the polarity is alternately reversed at 180° (=1 cyl) intervals in the radial direction (cross track direction) within the N-phase. In the Q-phase, in order to realize a pattern corresponding to the C-phase to the D-phase, a magnetization pattern may be arranged with phases in which the polarity is alternately reversed at 180° (=1 cyl) intervals in the radial direction within the Q-phase. Between the N-phase and the Q-phase, a magnetization pattern may be arranged with phases mutually shifted by 90° (=0.5 cyl) in the radial direction. In each of the N-phase and the Q-phase, the track cycle TP=½×(the pattern cycle in the cross track direction). In FIG. 4, the off-track position in a case where the target track is a track TRK_n is shown in a state normalized by a track cycle TP, on the assumption that the track center is 0, the inner circumference side (inside) is positive, and the outer circumference side is negative. FIG. 4 also illustrates tracks TRK_(n−1) and TRK_(n−2) adjacent to the track TRK_n on the inner circumference side, and tracks TRK_(n+1) and TRK_(n+2) adjacent to the track TRK_n on the outer circumference side.

As regards the down track direction (circumferential direction), in each of the N-phase and the Q-phase, the width of each portion magnetized in the first magnetization direction and the width of each portion magnetized in the second magnetization direction are different from each other. Accordingly, the duty ratio of the width of each portion magnetized in the first magnetization direction in each of the pattern cycles PPN and PPQ in the down track direction may be defined as shown in a formula 2. Further, as a value indicating the ratio between the width of each portion magnetized in the first magnetization direction and the width of each portion magnetized in the second magnetization direction, a parameter 'Duty' shown in a formula 3 may be defined. Here, with respect to the timing in the down track direction, the duty ratio is not a constant value but may be changed to a value other than 50%. For example, the duty ratio may be changed in the case of a burst pattern with eight peaks, such that the duty ratio is 10% for the first peak, 20% for the second peak, 30% for the third peak, 40% for the fourth peak, 60% for the fifth peak, 70% for the sixth peak, 80% for the seventh peak, and 90% for the eighth peak.

(The duty ratio)=(the width of each portion magnetized in the first magnetization direction)/{(the width of each portion magnetized in the first magnetization direction)+(the width of each portion magnetized in the second magnetization direction)}×100      Formula 2

Duty=(the duty ratio)−50      Formula 3

The parameter Duty takes 0 (Duty=0) when the width of each portion magnetized in the first magnetization direction and the width of each portion magnetized in the second magnetization direction are equal to each other (the duty ratio=50%). The parameter Duty takes a positive value (Duty>0) in the case of (the duty ratio>50%). The parameter Duty takes a negative value (Duty<0) in the case of (the duty ratio<50%).

In each of the N-phase and the Q-phase, the sign (polarity) of the parameter Duty may change depending on the radial position. For example, in the N-phase, the sign (polarity) of the Duty for each off-track position is expressed as shown in a formula 4.

If the off-track position=1.5 to 2,Duty<0.

If the off-track position=0.5 to 1.5,Duty>0.

If the off-track position=−0.5 to 0.5,Duty<0.

If the off-track position=−1.5 to −0.5,Duty>0.

If the off-track position=−2 to −1.5,Duty<0.      Formula 4

Similarly, in the Q-phase, the sign (polarity) of the Duty for each off-track position is expressed as shown in a formula 5.

If the off-track position=1 to 2,Duty>0.

If the off-track position=0 to 1,Duty<0.

If the off-track position=−1 to 0,Duty>0.

If the off-track position=−2 to −1,Duty<0.      Formula 5

On the other hand, as regards the cross track direction, in each of the N-phase and the Q-phase, the width of each portion magnetized in the first magnetization direction and the width of each portion magnetized in the second magnetization direction are equal to each other. Accordingly, in each of the N-phase and the Q-phase, the border lines between the portions magnetized in the first magnetization direction and the portions magnetized in the second magnetization direction are present along straight lines extending in the cross track direction.

For example, in the N-phase, between any pair of the tracks TRK_(n−2) to TRK_(n+2), the width of each portion magnetized in the first magnetization direction and the width of each portion magnetized in the second magnetization are equal to each other where these portions are adjacent to each other in the cross track direction. Accordingly, in the N-phase, the border lines between the portions magnetized in the first magnetization direction and the portions magnetized in the second magnetization direction, in each of the tracks TRK_(n−2) to TRK_(n+2), are present along straight lines extending in the cross track direction. Consequently, it is configured that, when the head 122 (write element R) travels along a track border in the N-phase, a signal read by the head 122 becomes null (zero).

Further, in the Q-phase, between any pair of the tracks TRK_(n−2) to TRK_(n+2), the width of each portion magnetized in the first magnetization direction and the width of each portion magnetized in the second magnetization are equal to each other where these portions are adjacent to each other in the cross track direction. Accordingly, in the Q-phase, the border lines between the portions magnetized in the first magnetization direction and the portions magnetized in the second magnetization direction, in the range between the track centers of two tracks adjacent to each other in the cross track direction, are present along straight lines extending in the cross track direction. Consequently, it is configured that, when the head 122 (read element R) travels along a track center in the Q-phase, a signal read by the head 122 becomes null (zero).

With the configuration illustrated in FIG. 4, it is possible to prevent the determination and correction from being performed erroneously by ½ cycle in the circumferential direction in the real-time initial phase correction described later.

Here, an explanation will be given to organize the reason as to why a detection error corresponding to one servo track occurs when the duty ratio=50% in the servo burst region Rbst.

FIG. 5A illustrates magnetization patterns in each of the N-phase (Null N) and the Q-phase (Null Q) when the duty ratio=50% and the burst gate BG rises with ideal timing. In FIG. 5A, the N-magnetic property is denoted as "1" and the S-magnetic property is denoted as "0". The "dibit" denotes a value obtained by normalizing a length in the circumferential direction by the pattern cycle.

The pattern in which the off-track position is "+0.25" and the burst gate BG deviation is "0" is used as a reference pattern. In each of the N-phase and the Q-phase, as illustrated in FIG. 5A, the following patters are mutually the same and thus cannot be distinguished from each other. These patterns are the pattern in which the off-track position is the same as that of the reference pattern and the burst gate BG deviation is "0.5", the pattern in which the burst gate BG deviation is the same as that of the reference pattern and the off-track position is a position of "−0.75" that is shifted by one track cycle to the outer circumference side, and the pattern in which the burst gate BG deviation is the same as that of the reference pattern and the off-track position is a position of "+1.25" that is shifted by one track cycle to the inner circumference side.

It can be seen that the pattern in which the timing correction amount is erroneously determined by 180 degrees (by 0.5 dibits) in the real-time initial phase correction described later has the same magnetization pattern as the patterns in which the off-track amount is shifted by ½ cycle (±1 Track). Accordingly, it can be seen that there is difficulty in determining whether the determination object has a deviation of 0.5 dibits in the timing or has a deviation of one track cycle in the radial direction and thus a demodulation error may be caused without a countermeasure, such as a pattern region for detecting the timing deviation.

In other words, if there is a difference between the pattern in which the timing is shifted by 0.5 dibits and the pattern in which the radial position is shifted by one track cycle, it is possible to determine which deviation state is present, and to perform correct position demodulation.

FIG. 5B illustrates magnetization patterns in each of the N-phase (Null N) and the Q-phase (Null Q) corresponding to the servo patterns illustrated in FIG. 4. In FIG. 5B, the N-magnetic property is denoted as "1" and the S-magnetic property is denoted as "0".

As illustrated in FIG. 5B, even if reproduction that should be performed as the "0101" pattern ends up with the "1010" pattern, which is the reverse pattern, in the real-time initial phase correction, it is set to prevent position demodulation shifted by one track cycle from being caused due to this reproduction. Specifically, here, with reference to the original demodulation position, the magnetization patterns at respective positions shifted by one track cycle therefrom are clearly different from the magnetization pattern at a position shifted by 0.5 pattern cycles therefrom in the circumferential direction.

However, even if there is a clear difference between magnetization patterns, the difference may be difficult to understand due to the characteristics of the head amplifier 124 and the characteristics of an analog filter of the RWC 125 provided as a preceding stage before the channel. Further, when the sine coefficient output (sine component) and the cosine coefficient output (cosine component) of the channel are used for this, the difference may become hardly distinguishable.

In consideration of the above, for example, it is considered to add a channel function that can acquire Duty information in the burst gate BG. Here, the function may be configured to output the difference between a count in which the ADC value in the burst gate BG is positive and a count in which the ADC value is negative. By using this new Duty detecting function, without depending on the timing of the burst gate BG, it is possible to clearly find a correction direction for the real-time initial phase correction as to whether the current track should be the "0101" pattern or should be the "1010" pattern.

Figure 6:
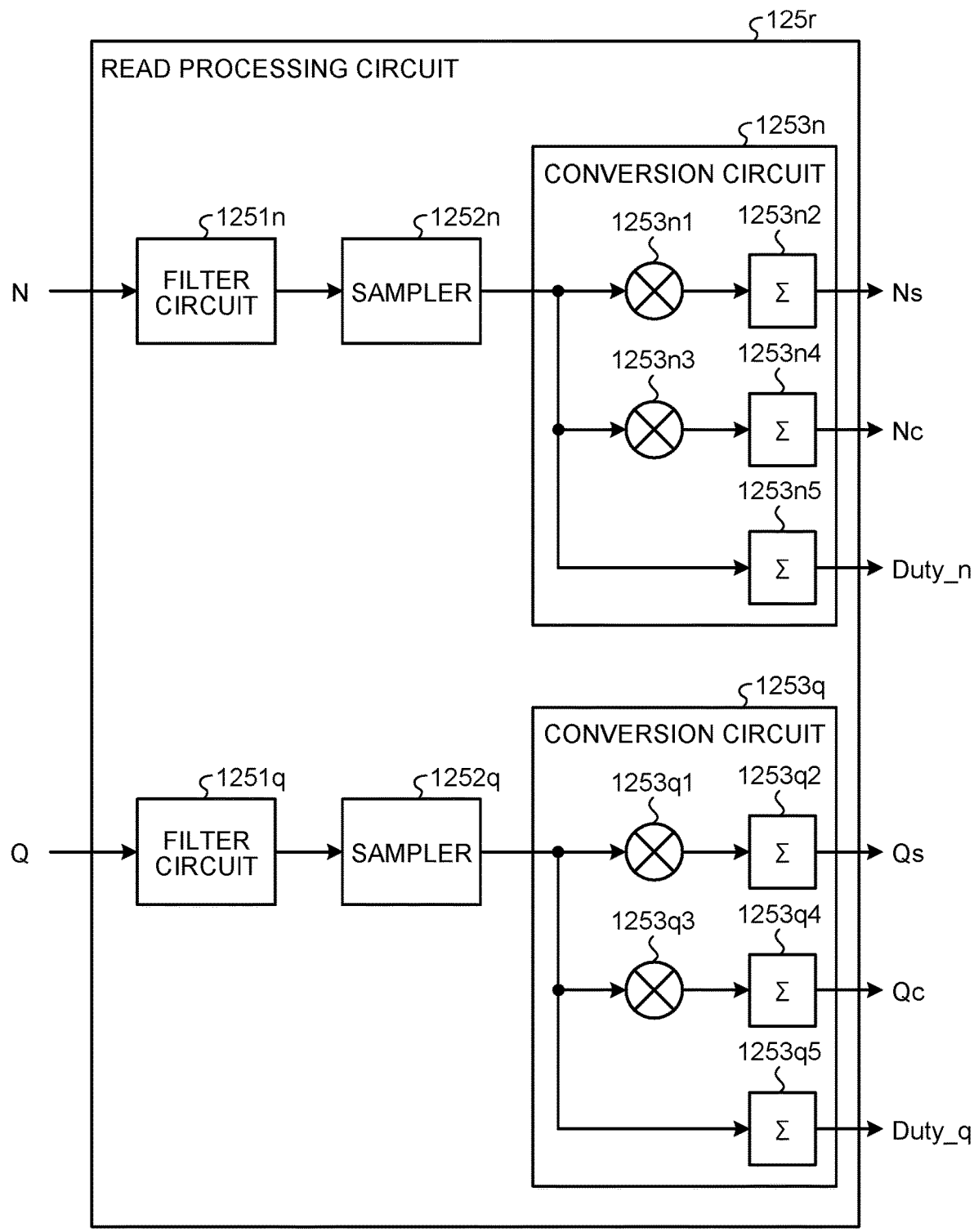
FIG. 6 is a diagram illustrating a configuration of a read processing circuit in the embodiment.

For example, the read processing circuit 125r of the RWC 125 may be configured as illustrated in FIG. 6. FIG. 6 is a diagram illustrating a configuration of the read processing circuit 125r. The read processing circuit 125r includes a filter circuit 1251n, a sampler 1252n, a conversion circuit 1253n, a filter circuit 1251q, a sampler 1252q, and a conversion circuit 1253q. The filter circuit 1251n, the sampler 1252n, and the conversion circuit 1253n are circuits corresponding to the N-phase, and the filter circuit 1251q, the sampler 1252q, and the conversion circuit 1253q are circuits corresponding to the Q-phase.

Upon reception of a signal read from the N-phase (Null N), the filter circuit 1251n performs predetermined equalization processing on the signal. For example, the filter circuit 1251n includes a continuous time filter (CTF), and performs analog filter processing on the signal by using a low pass filter (LPF) or the like to convert the signal to an equalized signal corresponding to a reproduced signal. The filter circuit 1251n supplies the equalized signal to the sampler 1252n.

The sampler 1252n performs sampling on the filter output signal at a predetermined sampling cycle, and supplies the sampling result to the conversion circuit 1253n.

The conversion circuit 1253n performs a discrete Fourier transform on the sampling result to obtain the sine component $N_s$ and the cosine component $N_c$ of the N-phase, and performs integration processing on the sampling result to obtain a parameter Duty_n indicating the duty ratio of the N-phase. The conversion circuit 1253n includes a multiplier 1253n1, an integrator 1253n2, a multiplier 1253n3, an integrator 1253n4, and an integrator 1253n5.

The multiplier 1253n1 multiplies the sampling result by a basic cosine function, and supplies the multiplication result to the integrator 1253n2. The basic cosine function includes a normalized amplitude and a target phase (initial phase). The integrator 1253n2 integrates the multiplication result, and outputs the integration result as the sine component $N_s$ of the N-phase.

The multiplier 1253n3 multiplies the sampling result by a basic sine function, and supplies the multiplication result to the integrator 1253n4. The basic sine function includes a normalized amplitude and a target phase (initial phase). The integrator 1253n4 integrates the multiplication result, and outputs the integration result as the cosine component $N_c$ of the N-phase.

The integrator 1253n5 integrates the sampling result, and outputs the integration result as a parameter Duty_n indicating the duty ratio of the N-phase. As shown in the formula 4, the parameter Duty_n has a sign (polarity) depending on the off-track position of the head 122.

Upon reception of a signal read from the Q-phase (Null Q), the filter circuit 1251q performs predetermined equalization processing on the signal. For example, the filter circuit 1251q includes a continuous time filter (CTF), and performs analog filter processing on the signal by using a low pass filter (LPF) or the like to convert the signal to a filter output signal corresponding to a reproduced signal. The filter circuit 1251q supplies the filter output signal to the sampler 1252q.

The sampler 1252q performs sampling on the filter output signal at a predetermined sampling cycle, and supplies the sampling result to the conversion circuit 1253q.

The conversion circuit 1253q performs a discrete Fourier transform on the sampling result to obtain the sine component $Q_s$ and the cosine component $Q_c$ of the Q-phase, and performs integration processing on the sampling result to obtain a parameter Duty_q indicating the duty ratio of the Q-phase. The conversion circuit 1253q includes a multiplier 1253q1, an integrator 1253q2, a multiplier 1253q3, an integrator 1253q4, and an integrator 1253q5.

The multiplier 1253q1 multiplies the sampling result by a basic cosine function, and supplies the multiplication result to the integrator 1253q2. The basic cosine function includes a normalized amplitude and a target phase (initial phase). The integrator 1253q2 integrates the multiplication result, and outputs the integration result as the sine component $Q_s$ of the Q-phase.

The multiplier 1253q3 multiplies the sampling result by a basic sine function, and supplies the multiplication result to the integrator 1253q4. The basic sine function includes a normalized amplitude and a target phase (initial phase). The integrator 1253q4 integrates the multiplication result, and outputs the integration result as the cosine component $Q_c$ of the Q-phase.

The integrator 1253q5 integrates the sampling result, and outputs the integration result as a parameter Duty_q indicating the duty ratio of the Q-phase. As shown in the formula 5, the parameter Duty_q has a sign (polarity) depending on the off-track position of the head 122.

Figure 7A:
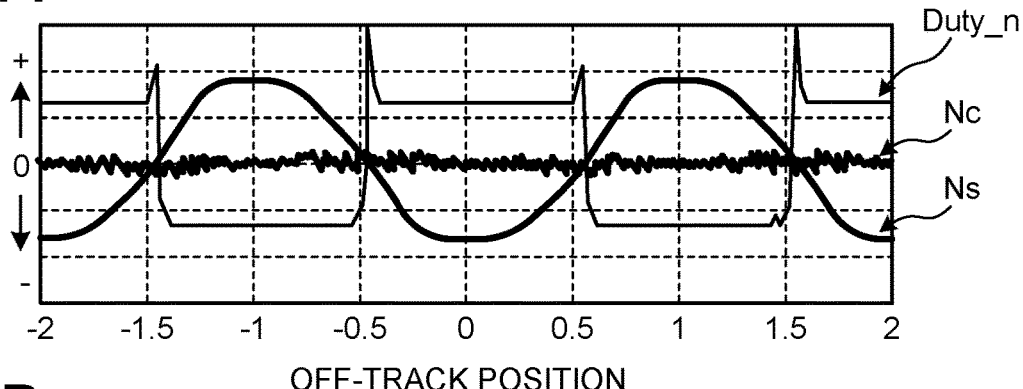
FIGS. 7A to 7D are diagrams each illustrating burst signals and a duty signal in the embodiment.
Figure 7B:
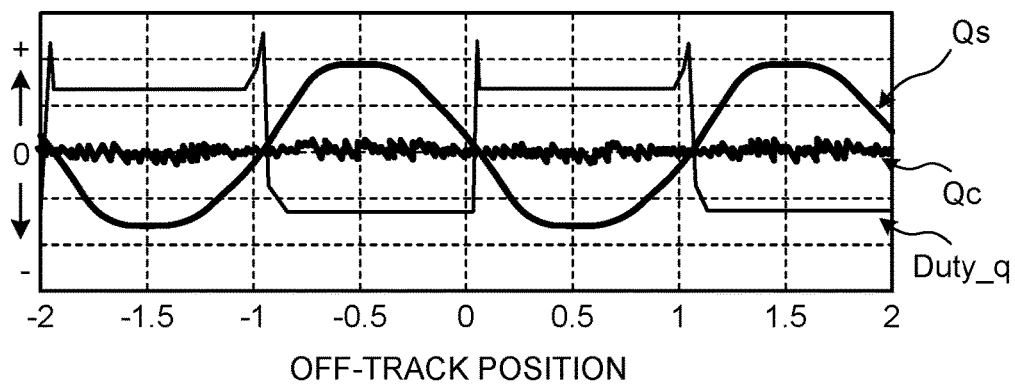

For example, when the deviation of the burst gate BG is −0.5 dibits, the burst signals (the sine component $N_s$ and the cosine component $N_c$ of the N-phase) and the duty signal (parameter Duty_n) of the N-phase are as shown in FIG. 7A, and the burst signals (the sine component $Q_s$ and the cosine component $Q_c$ of the Q-phase) and the duty signal (parameter Duty_q) of the Q-phase are as shown in FIG. 7B.

Figure 7C:
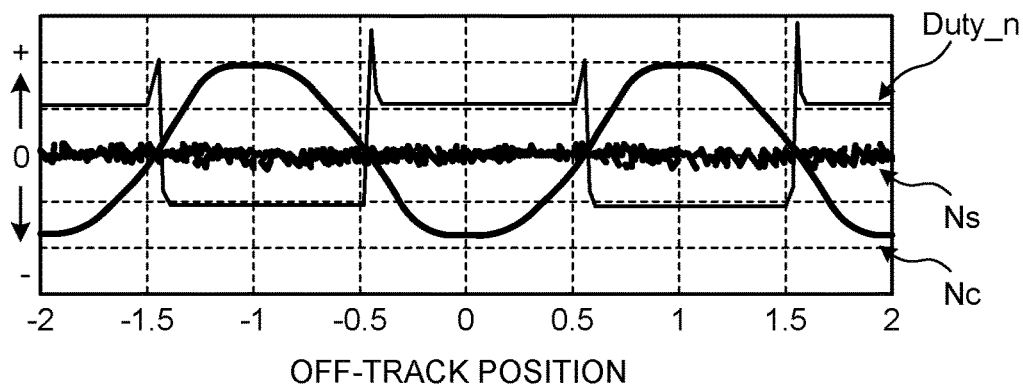
Figure 7D:
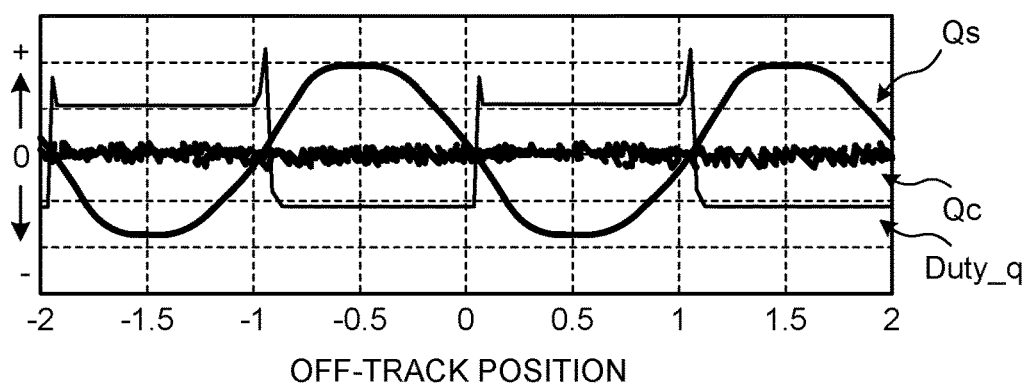

Further, when the deviation of the burst gate BG is −0.25 dibits, the burst signals (the sine component $N_s$ and the cosine component $N_c$ of the N-phase) and the duty signal (parameter Duty_n) of the N-phase are as shown in FIG. 7C, and the burst signals (the sine component $Q_s$ and the cosine component $Q_c$ of the Q-phase) and the duty signal (parameter Duty_q) of the Q-phase are as shown in FIG. 7D.

Figure 8A:
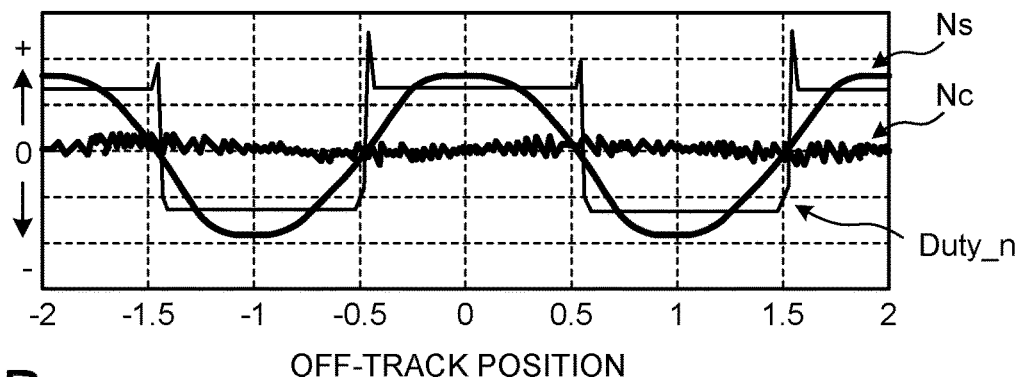
FIGS. 8A to 8D are diagrams each illustrating burst signals and a duty signal in the embodiment.
Figure 8B:
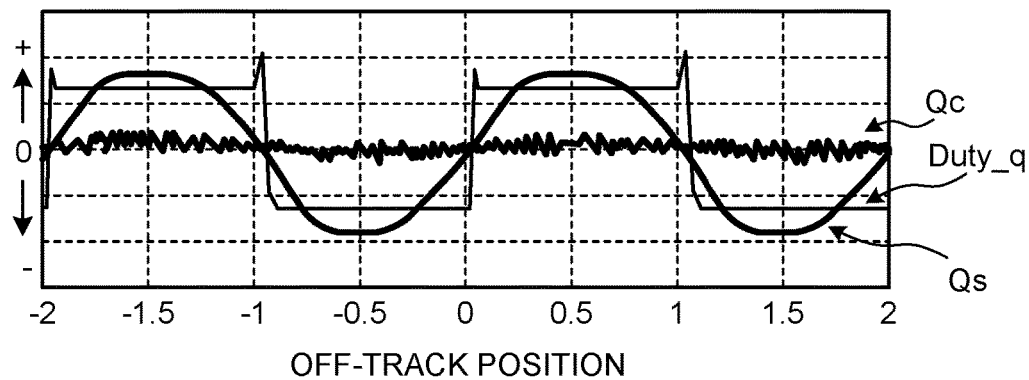

Further, when the deviation of the burst gate BG is 0 dibits (no deviation), the burst signals (the sine component $N_s$ and the cosine component $N_c$ of the N-phase) and the duty signal (parameter Duty_n) of the N-phase are as shown in FIG. 8A, and the burst signals (the sine component $Q_s$ and the cosine component $Q_c$ of the Q-phase) and the duty signal (parameter Duty_q) of the Q-phase are as shown in FIG. 8B.

Figure 8C:
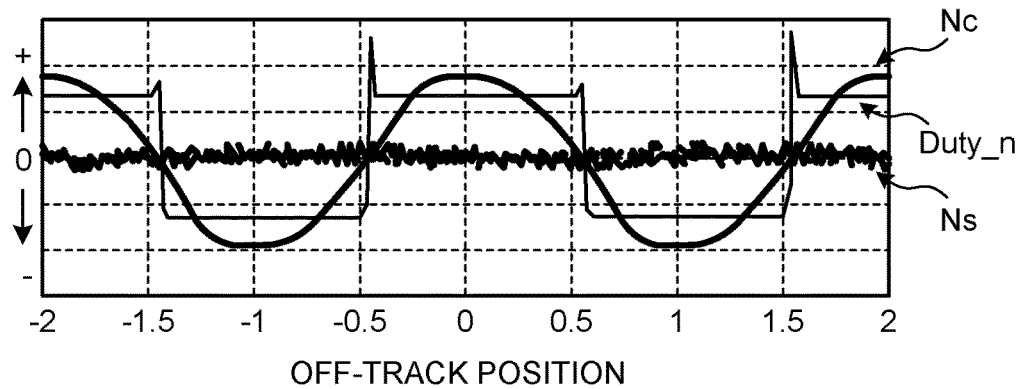
Figure 8D:
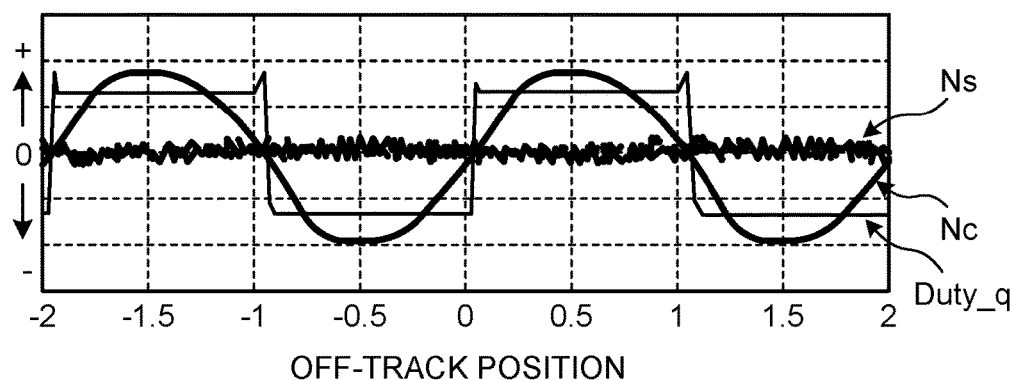

Further, when the deviation of the burst gate BG is +0.25 dibits, the burst signals (the sine component $N_s$ and the cosine component $N_c$ of the N-phase) and the duty signal (parameter Duty_n) of the N-phase are as shown in FIG. 8C, and the burst signals (the sine component $Q_s$ and the cosine component $Q_c$ of the Q-phase) and the duty signal (parameter Duty_q) of the Q-phase are as shown in FIG. 8D.

As illustrated in FIGS. 7A to 8D, regardless of any deviation of the burst gate BG, each of the duty signals (parameters Duty_n and Duty_q) indicates correct off-track quadrant information. Consequently, as long as the deviation of the burst gate BG falls within a range of −0.5 dibits to 0.5 dibits (−180 degrees to 180 degrees), the phase correction amount to regain can be accurately obtained. Specifically, by employing a pattern in which the duty ratio is largely different between the deviation in the cross track direction and the deviation in the down track direction, the regaining direction in the real-time initial phase correction is clarified. Consequently, in the real-time initial phase correction, even if an erroneous pattern is obtained, it is possible to perform conversion into a correct value.

Incidentally, as to which quadrant of the off-track cycle the signal to be demodulated corresponds to, it is possible to perform determination as shown in the following formula 6 by utilizing the parameters Duty_n and Duty_q. Thus, the real-time initial phase correction can be extended to output a correction value from −180 degrees to 180 degrees on the basis of the quadrant information P.

If (Duty_n≥0)&&(Duty_q≥0),{P=1,# quadrant information P is set to the first quadrant (the off-track position=a range of 0 to 0.5)}

If (Duty_n<0)&&(Duty_q≥0),{P=2,# quadrant information P is set to the first quadrant (the off-track position=a range of 0.5 to 1)}

If (Duty_n<0)&&(Duty_q<0),{P=3,# quadrant information P is set to the first quadrant (the off-track position=a range of −1 to −0.5)}

If (Duty_n≥0)&&(Duty_q≥0),{P=4,# quadrant information P is set to the first quadrant (the off-track position=a range of −0.5 to 0)}   Formula 6

Accordingly, on the basis of the quadrant pattern to regain, phase correction (i.e., real-time initial phase correction) is performed as shown in the following formulas 7 to 14.

$\theta_N = \arctan(N_s/N_c)$   Formula 7

$\theta_Q = \arctan(Q_s/Q_c)$   Formula 8

If$(P=2)$,$\{\theta_N = \theta_N - \pi\}$

If$(P=3)$,$\{\theta_N = \theta_N - \pi, \theta_Q = \theta_Q - \pi\}$

If$(P=4)$,$\{\theta_Q = \theta_Q - \pi\}$   Formula 9

$N_r = (N_s^2 + N_c^2)/(N_s^2 + N_c^2 + Q_s^2 + Q_c^2)$   Formula 10

$N_{wt} = $ Weight Table$[N_r \times 128]$   Formula 11

$\theta_{cr} = \theta_N \times N_{wt} + \theta_Q \times (1 \times N_{wt})$   Formula 12

$N_{cc} = N_c \times \cos\theta_{cr} + N_s \times \sin\theta_{cr}$   Formula 13

$Q_{cc} = Q_c \times \cos\theta_{cr} + Q_s \times \sin\theta_{cr}$   Formula 14

In the formulas 7 to 14, $\theta_N$ denotes the initial phase of the N-phase before correction, and $\theta_Q$ denotes the initial phase of the Q-phase before correction. $N_r$ denotes a signal ratio in which the square of the absolute value of the N-phase signal amplitude is used as a numerator while the sum of the square of the absolute value of the N-phase signal amplitude and the square of the absolute value of the Q-phase signal amplitude is used as the denominator. Weight Table denotes a table for weighting the initial phase of the N-phase and the initial phase of the Q-phase. $N_{wt}$ denotes the weight of the N-phase. $\theta_{cr}$ denotes a correction phase. $N_c$ denotes the amplitude of the cosine component of the N-phase before correction, and $Q_c$ denotes the amplitude of the cosine component of the Q-phase before correction. $N_s$ denotes the amplitude of the sine component of the N-phase before correction, and $Q_s$ denotes the amplitude of the sine component of the Q-phase before correction. $N_{cc}$ denotes the amplitude of the cosine component of the N-phase after correction, and $Q_{cc}$ denotes the amplitude of the cosine component of the Q-phase after correction.

The Weight Table may have a resolution of 128. The Weight Table shows the relationship of the signal ratio in which the square of the absolute value of the N-phase signal amplitude is used as a numerator while the sum of the square of the absolute value of the N-phase signal amplitude and the square of the absolute value of the Q-phase signal amplitude is used as the denominator, with the weights of the initial phase of the N-phase and the initial phase of the Q-phase. Here, the Weight Table may shows the relationship of a signal ratio in which the square of the absolute value of the Q-phase signal amplitude is used as a numerator while the sum of the square of the absolute value of the N-phase signal amplitude and the square of the absolute value of the Q-phase signal amplitude is used as the denominator, with the weights of the initial phase of the N-phase and the initial phase of the Q-phase.

As shown in formulas 7 to 14, it is possible to obtain the phase angle $\theta_{cr}$ to correctly regain, by the real-time initial phase correction that corrects the initial phases $\theta_N$ and $\theta_Q$, weight-averages the corrected phases $\theta_N$ and $\theta_Q$, and obtains a correction angle.

Here, the real-time initial phase correction may be performed by using software at the controller 130, or may be performed by using hardware (for example, by a circuit provided as a subsequent stage after the read processing circuit 125*r* in the RWC 125).

Next, an explanation will be given of an operation of the disk device 100, with reference to FIG. 9. FIG. 9 is a flowchart illustrating an operation of the disk device 100.

In the disk device 100, when the head 122 is positioned at a servo area SA, the controller 130 determines whether this servo area SA is a short servo area SSV (S1). When the servo area SA is a normal servo area NSV (No at S1), the controller 130 performs demodulation processing on the normal servo area NSV by using the normal servo demodulation scheme (S20).

When the servo area SA is a short servo area SSV (Yes at S1), the controller 130 determines whether the operation to be performed is a seeking operation (S2). When the operation to be performed is a seeking operation (Yes at S2), the controller 130 performs demodulation processing on the short servo area SSV by using the normal servo demodulation scheme (S20).

When the operation to be performed is a predetermined operation (such as a read operation or write operation) other than the seeking operation (No at S2), the controller 130 performs demodulation processing on the short servo area SSV by using the short servo demodulation scheme (S10). Specifically, the controller 130 acquires the burst signals and the duty signals of the N-phase and the Q-phase from the servo burst region Rbst (S11), and determines which quadrant of the off-track cycle the signal to be demodulated corresponds to, on the basis of the duty signals of the N-phase and the Q-phase thus acquired (S12). In accordance with this determination result and the burst signals of the N-phase and the Q-phase, the controller 130 performs phase correction as shown in the formulas 7 to 14 (S13), and thereby obtains a phase angle $\theta_{cr}$ to correctly regain (S14). The controller 130 obtains the current position of the head 122 by using the phase angle $\theta_{cr}$ (S15), and performs positioning of the head 122 on the basis of this current position, to perform a predetermined operation (such as a read operation or write operation with respect to the data area DA).

As described above, according to this embodiment, the disk medium 111 is configured such that the pattern of the servo burst region Rbst is formed of a pattern that can distinguish a deviation in the down track direction and a deviation in the cross track direction from each other. Consequently, the disk device 1 is allowed to appropriately derive the position of the head 122 at the short servo demodulation while suppressing a reduction of the data recording capacity. Thus, it is possible to provide the disk device 1 in a state suitable for improving the data recording capacity of the disk medium 111.

Here, the short servo area SSV may be an area which does not include the preamble, the servo mark, and the gray code that are not to be demodulated. In this case, the write gate signal WG may transition from an asserted state to a deasserted state at a position before the leading end of the short servo area SSV (i.e., the leading end of the servo burst region Rbst) by the gap amount Gwr. Consequently, data may be written in the data area DA up to a position before the leading end of the short servo area SSV by the gap amount Gwr. Further, in a seeking operation, positioning of the head 122 may be performed by using servo information read from the normal servo area NSV immediately before.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
    a head; and
    a disk medium,
wherein
    the disk medium includes a servo area having a plurality of servo tracks,
    the servo area includes a burst region of a null type in which a magnetization polarity is reversed for every one of the servo tracks,
    a first pattern, which is cut out from the burst region at a certain servo track by a first length and with a first start position, does not match a second pattern, which is cut out from the burst region at an adjacent servo track by the first length and with an arbitrary second start position including first timing,
    the burst region at the servo tracks includes a first burst pattern,
    the first burst pattern includes
        a first magnetized portion where a first value is recorded, and
        a second magnetized portion where a second value reverse to the first value in polarity is recorded, the second magnetized portion being adjacent to the first magnetized portion in a down track direction, and
    a width of the first magnetized portion in the down track direction and a width of the second magnetized portion in the down track direction are different from each other.

2. The disk device according to claim 1, wherein
the first burst pattern further includes
    a third magnetized portion where the second value is recorded, the third magnetized portion being adjacent to the first magnetized portion in a cross track direction, and
    a fourth magnetized portion where the first value is recorded, the fourth magnetized portion being adjacent to the third magnetized portion in the down track direction, and
a border line between the first magnetized portion and the second magnetized portion and a border line between the third magnetized portion and the fourth magnetized portion are present along a straight line extending in the cross track direction.

3. The disk device according to claim 2, wherein
a width of the third magnetized portion in the down track direction and a width of the fourth magnetized portion in the down track direction are different from each other.

4. The disk device according to claim 1, wherein
the burst region at the servo tracks further includes a second burst pattern,
the second burst pattern includes
    a fifth magnetized portion where the first value is recorded, the fifth magnetized portion being shifted from the first magnetized portion in position in the cross track direction, and
    a sixth magnetized portion where the second value is recorded, the sixth magnetized portion being adjacent to the fifth magnetized portion in the down track direction, and
a width of the fifth magnetized portion in the down track direction and a width of the sixth magnetized portion in the down track direction are different from each other.

5. The disk device according to claim 2, wherein
the burst region at the servo tracks further includes a second burst pattern,
the second burst pattern includes
    a fifth magnetized portion where the first value is recorded, the fifth magnetized portion being shifted from the first magnetized portion in position in the cross track direction,
    a sixth magnetized portion where the second value is recorded, the sixth magnetized portion being adjacent to the fifth magnetized portion in the down track direction,
    a seventh magnetized portion where the second value is recorded, the seventh magnetized portion being adjacent to the fifth magnetized portion in the cross track direction, and an eighth magnetized portion where the first value is recorded, the eighth magnetized portion being adjacent to the seventh magnetized portion in the down track direction,
a width of the fifth magnetized portion in the down track direction and a width of the sixth magnetized portion in the down track direction are different from each other, and
a border line between the fifth magnetized portion and the sixth magnetized portion and a border line between the seventh magnetized portion and the eighth magnetized portion are present along a straight line extending in the cross track direction.

6. The disk device according to claim 5, wherein
a width of the third magnetized portion in the down track direction and a width of the fourth magnetized portion in the down track direction are different from each other, and
a width of the seventh magnetized portion in the down track direction and a width of the eighth magnetized portion in the down track direction are different from each other.

7. The disk device according to claim 2, further comprising a controller configured to determine a ratio between a width of a portion where the first value is recorded and a width of a portion where the second value is recorded, in the down track direction, on a basis of information read from the burst region, and to perform processing in accordance with a determination result.

8. The disk device according to claim 1, wherein
tracks include
a first servo area corresponding to a normal servo demodulation scheme, and
a second servo area corresponding to a short servo demodulation scheme.

9. The disk device according to claim 8, wherein
the head includes
a read element, and
a write element arranged with a predetermined gap amount with respect to the read element,
the first servo area is separated by a first distance from a tail end of a data recording location in a data area, and
the second servo area is separated by a second distance, which is shorter than the first distance by the predetermined gap amount, from a tail end of a data recording location in a data area.

10. The disk device according to claim 8, further comprising a controller configured to perform positioning of the head on a basis of information read from the burst region and a region other than the burst region in the first servo area, and to perform positioning of the head by determining a ratio between a width of a portion where the first value is recorded and a width of a portion where the second value is recorded, in the down track direction, on a basis of information read from the burst region in the second servo area.

11. The disk device according to claim 9, further comprising a controller configured to perform positioning of the head on a basis of information read from the burst region and a region other than the burst region in the first servo area, and to perform positioning of the head by determining a ratio between a width of a portion where the first value is recorded and a width of a portion where the second value is recorded, in the down track direction, on a basis of information read from the burst region in the second servo area.

12. A disk device comprising:
a head; and
a disk medium,
wherein
the disk medium includes a servo area having a plurality of servo tracks,
the servo area includes a burst region of a null type in which a magnetization polarity is reversed for every one of the servo tracks,
a first pattern, which is cut out from the burst region at a certain servo track by a first length and with a first start position, does not match a second pattern, which is cut out from the burst region at an adjacent servo track by the first length and with an arbitrary second start position including first timing, and
the burst region at the servo tracks includes a first burst pattern,
the first burst pattern includes
a first magnetized portion where a first value is recorded,
a second magnetized portion where a second value reverse to the first value in polarity is recorded, the second magnetized portion being adjacent to the first magnetized portion in a down track direction, and
a third magnetized portion where the second value is recorded, the third magnetized portion being adjacent to the first magnetized portion in a cross track direction,
a width of the first magnetized portion in the down track direction and a width of the second magnetized portion in the down track direction are different from each other, and
the width of the first magnetized portion in the down track direction and a width of the third magnetized portion in the down track direction are equivalent to each other.

13. The disk device according to claim 12, wherein
the first burst pattern further includes fourth magnetized portion where the first value is recorded, the fourth magnetized portion being adjacent to the third magnetized portion in the down track direction, and
the width of the second magnetized portion in the down track direction and a width of the fourth magnetized portion in the down track direction are equivalent to each other.

14. The disk device according to claim 13, wherein
the width of the third magnetized portion in the down track direction and the width of the fourth magnetized portion in the down track direction are different from each other.

15. The disk device according to claim 12, wherein
the burst region at the servo tracks further includes a second burst pattern,
the second burst pattern includes
a fifth magnetized portion where the first value is recorded, the fifth magnetized portion being shifted from the first magnetized portion in position in the cross track direction,
a sixth magnetized portion where the second value is recorded, the sixth magnetized portion being adjacent to the fifth magnetized portion in the down track direction, and
a seventh magnetized portion where the second value is recorded, the seventh magnetized portion being adjacent to the fifth magnetized portion in the cross track direction,
a width of the fifth magnetized portion in the down track direction and a width of the sixth magnetized portion in the down track direction are different from each other, and
the width of the fifth magnetized portion in the down track direction and a width of the seventh magnetized portion in the down track direction are equivalent to each other.

16. The disk device according to claim 13, wherein
the burst region at the servo tracks further includes a second burst pattern,
the second burst pattern includes
- a fifth magnetized portion where the first value is recorded, the fifth magnetized portion being shifted from the first magnetized portion in position in the cross track direction,
- a sixth magnetized portion where the second value is recorded, the sixth magnetized portion being adjacent to the fifth magnetized portion in the down track direction,
- a seventh magnetized portion where the second value is recorded, the seventh magnetized portion being adjacent to the fifth magnetized portion in the cross track direction, and
- an eighth magnetized portion where the first value is recorded, the eighth magnetized portion being adjacent to the seventh magnetized portion in the down track direction, a width of the fifth magnetized portion in the down track direction and a width of the sixth magnetized portion in the down track direction are different from each other, and the width of the fifth magnetized portion in the down track direction and a width of the seventh magnetized portion in the down track direction are equivalent to each other.

17. The disk device according to claim 16, wherein the width of the third magnetized portion in the down track direction and the width of the fourth magnetized portion in the down track direction are different from each other, and the width of the seventh magnetized portion in the down track direction and a width of the eighth magnetized portion in the down track direction are different from each other.

18. The disk device according to claim 12, further comprising a controller configured to determine a ratio between a width of a portion where the first value is recorded and a width of a portion where the second value is recorded, in the down track direction, on a basis of information read from the burst region, and to perform processing in accordance with a determination result.

19. The disk device according to claim 13, further comprising a controller configured to determine a ratio between a width of a portion where the first value is recorded and a width of a portion where the second value is recorded, in the down track direction, on a basis of information read from the burst region, and to perform processing in accordance with a determination result.

* * * * *